United States Patent [19]

Persson

[11] 4,147,099
[45] Apr. 3, 1979

[54] ROOT-CROWNING APPARATUS
[75] Inventor: Agne C. Persson, Naantali, Finland
[73] Assignee: Inmektor KY, Naantali, Finland
[21] Appl. No.: 810,987
[22] Filed: Jun. 29, 1977
[51] Int. Cl.² ............... A23N 15/02; A23N 15/04
[52] U.S. Cl. ........................... 99/636; 99/643
[58] Field of Search ............ 99/546, 635–637, 99/639, 643; 83/409.1, 411 A

[56] References Cited
U.S. PATENT DOCUMENTS
2,770,274  11/1956  Mencacci .................. 99/639

FOREIGN PATENT DOCUMENTS
217109  4/1968  U.S.S.R. ................. 99/636

Primary Examiner—Christopher K. Moore
Attorney, Agent, or Firm—Montague & Ross

[57] ABSTRACT

An apparatus for trimming the ends of edible elongate roots, such as carrots, comprises a carrousel with upstanding upright partitions along which the centrally deposited roots move under centrifugal force into a set of ascending radial guide channels, coming to rest with their leading ends against a first peripheral barrier. Upon reaching a gap in that barrier, the roots approach a stationary first blade which cuts off their leading ends. Having passed the blade, the roots are centrifugally propelled into a set of steeply descending guide channels which they enter with their uncut ends facing down, coming to rest against a second peripheral barrier until they reach a gap at which a stationary second blade cuts off these latter ends.

7 Claims, 8 Drawing Figures

ROOT-CROWNING APPARATUS

FIELD OF THE INVENTION

My present invention relates to an apparatus for cutting off the ends of carrots and other elongate edible roots.

BACKGROUND OF THE INVENTION

After roots such as carrots are peeled by hand or by machine, the two ends of a root are often found to be discolored or otherwise damaged on account of the greater pressure to which they are subjected in the peeling process. It therefore becomes necessary to trim off these damaged ends before the product is marketed.

While manual topping or crowning of the roots limits the amount of waste, such a process is relatively time-consuming and correspondingly expensive. Various devices have therefore already been proposed for automatically trimming such roots, as by directing the roots into cylindrical or tapering pockets from which they partially project so as to facilitate their topping by a relatively movable blade. Another known solution resides in manually securing the roots to a conveyor with their ends sticking out on opposite sides so as to be cut off on moving past respective knives.

All these known devices are of limited efficiency and produce considerable waste on account of the variations of such roots in both lengths and thickness.

OBJECTS OF THE INVENTION

The general object of my present invention, therefore, is to provide an improved apparatus for the automatic trimming of carrots and other roots at both ends, designed to obviate the aforestated drawbacks.

A more particular object is to provide means in such apparatus for making the length of the cut-off end portions independent of the length or thickness of the roots to be crowned.

SUMMARY OF THE INVENTION

I realize these objects, in accordance with my present invention, by the provision of a carrousel rotating about a generally vertical axis, such rotation causing the roots deposited thereon to be centrifugally accelerated in a radially outward direction. The carrousel is provided with first guide means for conducting a root so accelerated along a first path toward first cutter means, at an exit of that path, for trimming the leading end off the oncoming root; with the aid of second guide means on the carrousel, disposed beyond the first cutter means, the root so trimmed is conducted further outwardly in an inverted position along a second path, sharply inclined with reference to the first path, with the hitherto uncut root end now in leading position, the latter end being trimmed off by second cutter means at an exit of the second path.

According to a more particular feature of my invention, the carrousel has two concentric arrays of substantially radial channels, i.e. ascending channels forming part of the first guide means and descending channels forming part of the second guide means, each descending channel being aligned with a respective ascending channel to receive the oncoming roots which have already been crowned at one end. The channels of each array are advantageously interleaved with substantially radial upright partitions which help entrain the roots in the direction of rotation and also direct them into the associated channels.

According to a further feature of my invention, the two arrays of radial channels terminate just short of respective arcuate, stationary barriers which retain the roots in these channels, except for a limited end portion projecting therefrom, until they reach a gap in the respective barrier where these projecting portions are removed by the corresponding cutter means. With the second array of channels steeply inclined so as to be nearly vertical, the inverted roots come to rest on the second barrier under the combined effect of centrifugal force and gravity.

By making the distance of either the cutters of the barriers from the respective channel arrays adjustable, the length of the root ends chopped off by the first and/or the second cutter means may be varied for optimum efficiency with roots of different type, origin or age.

BRIEF DESCRIPTION OF THE DRAWING

The above and other features of my invention will become more readily apparent from the following detailed description, reference being made to the accompanying drawing in which.

SPECIFIC DESCRIPTION

Figure 1:
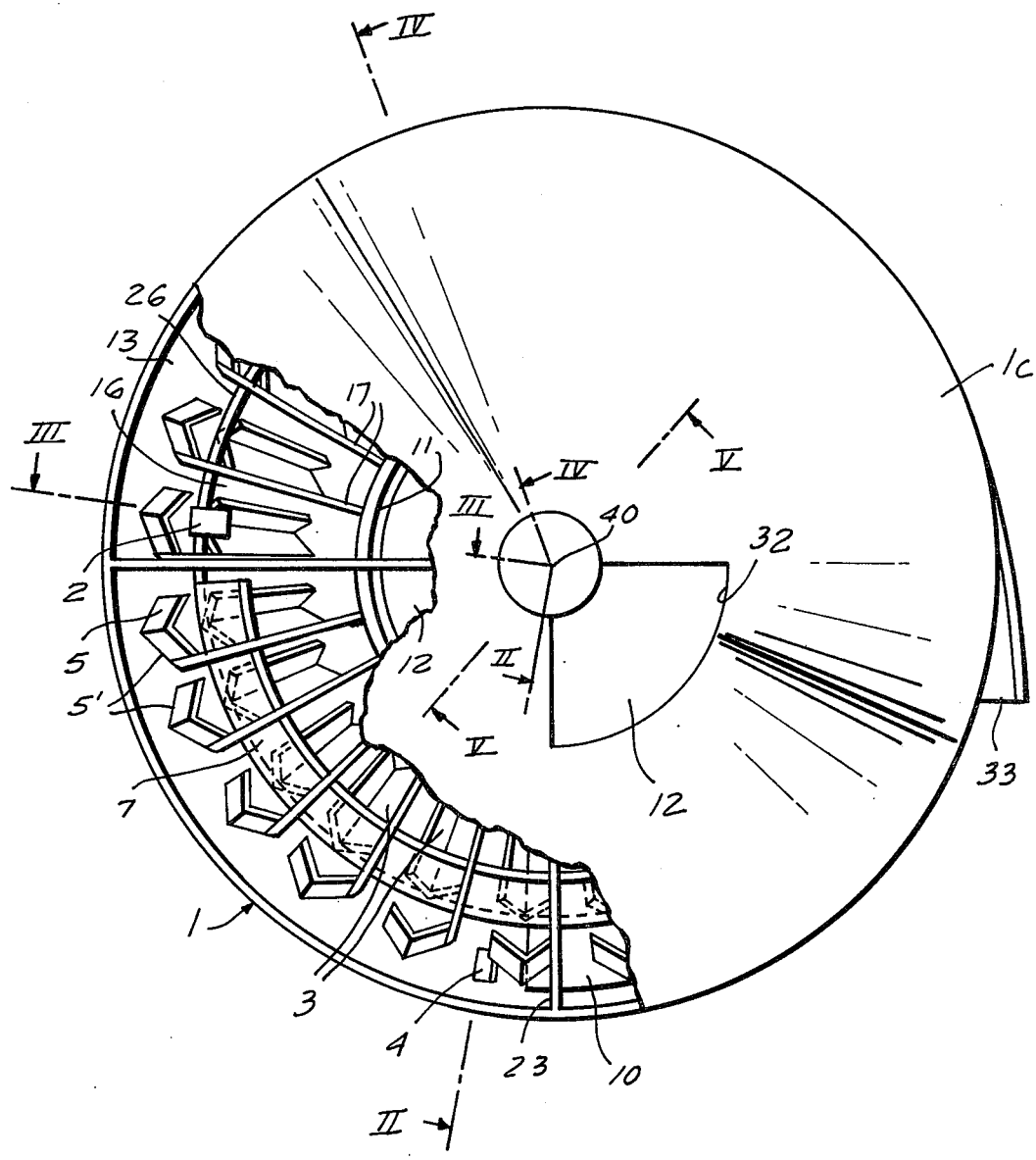
FIG. 1 is a top view of a root-crowning apparatus according to my invention with a cover partly broken away to reveal underlying details.
Figure 2:
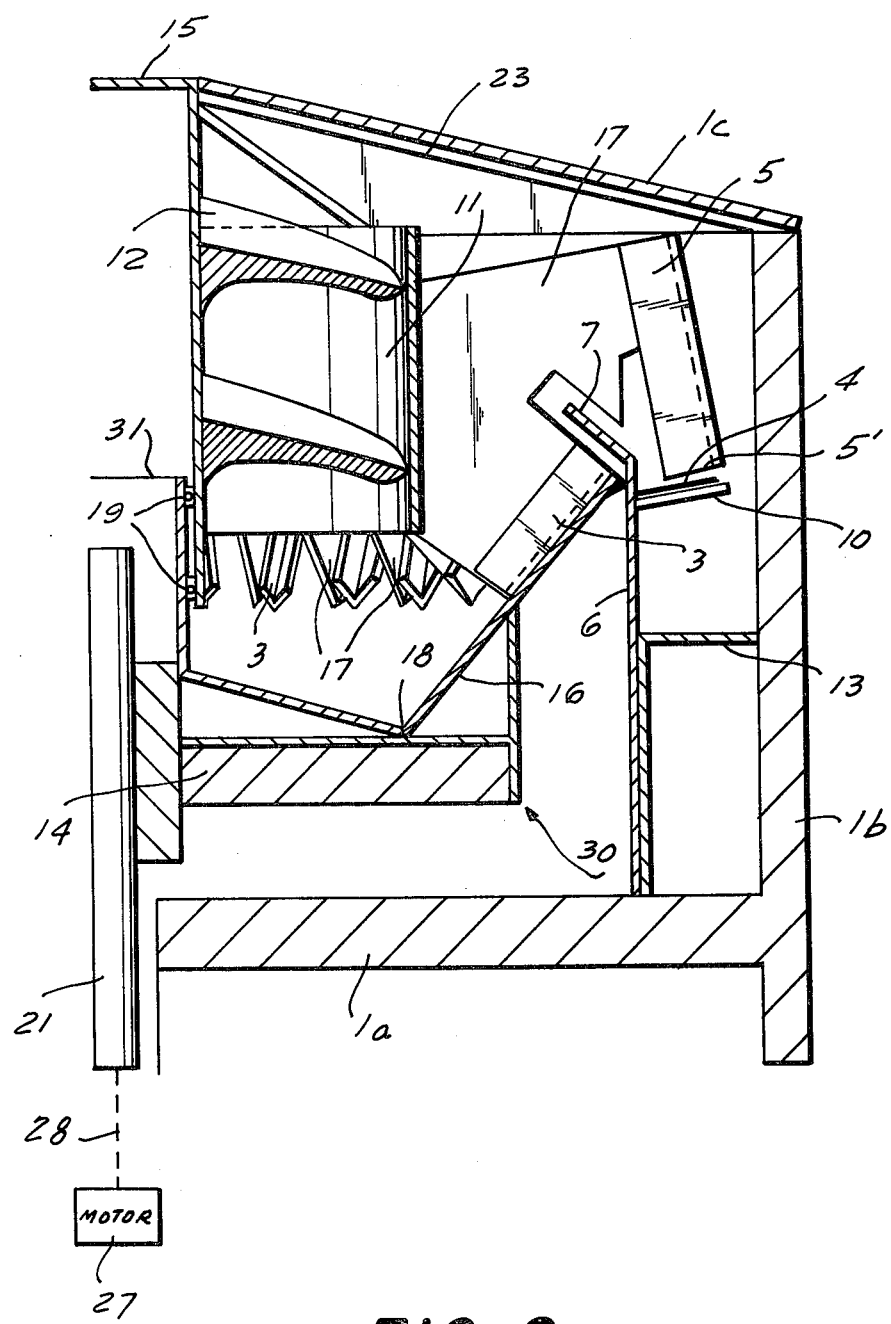
FIGS. 2, 3, 4, 5 and 6 are partial cross-sectional views respectively taken on lines II—II, III—III, IV—IV, V—V and VI—VI of FIG. 1.
Figure 3:
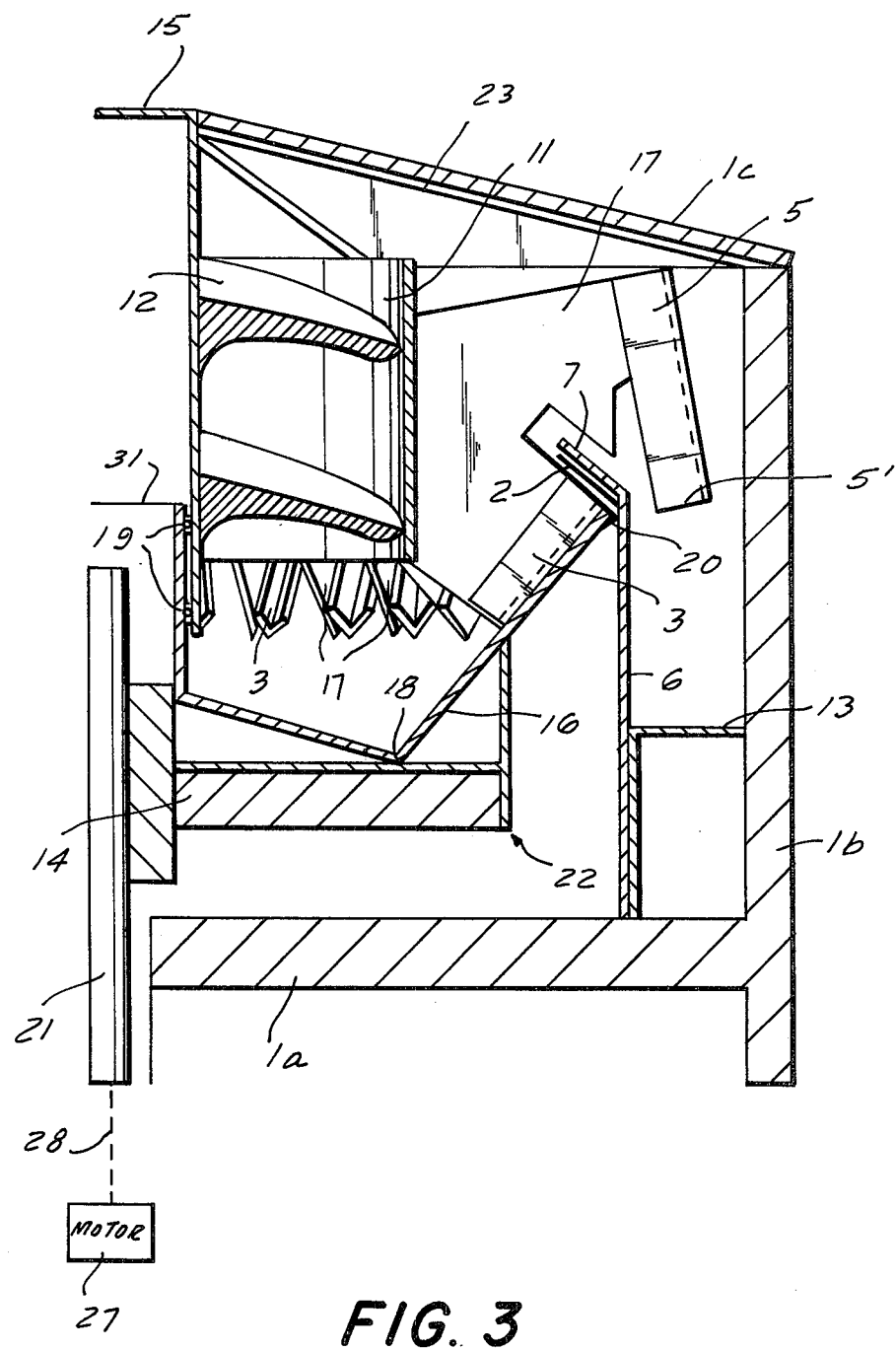
Figure 4:
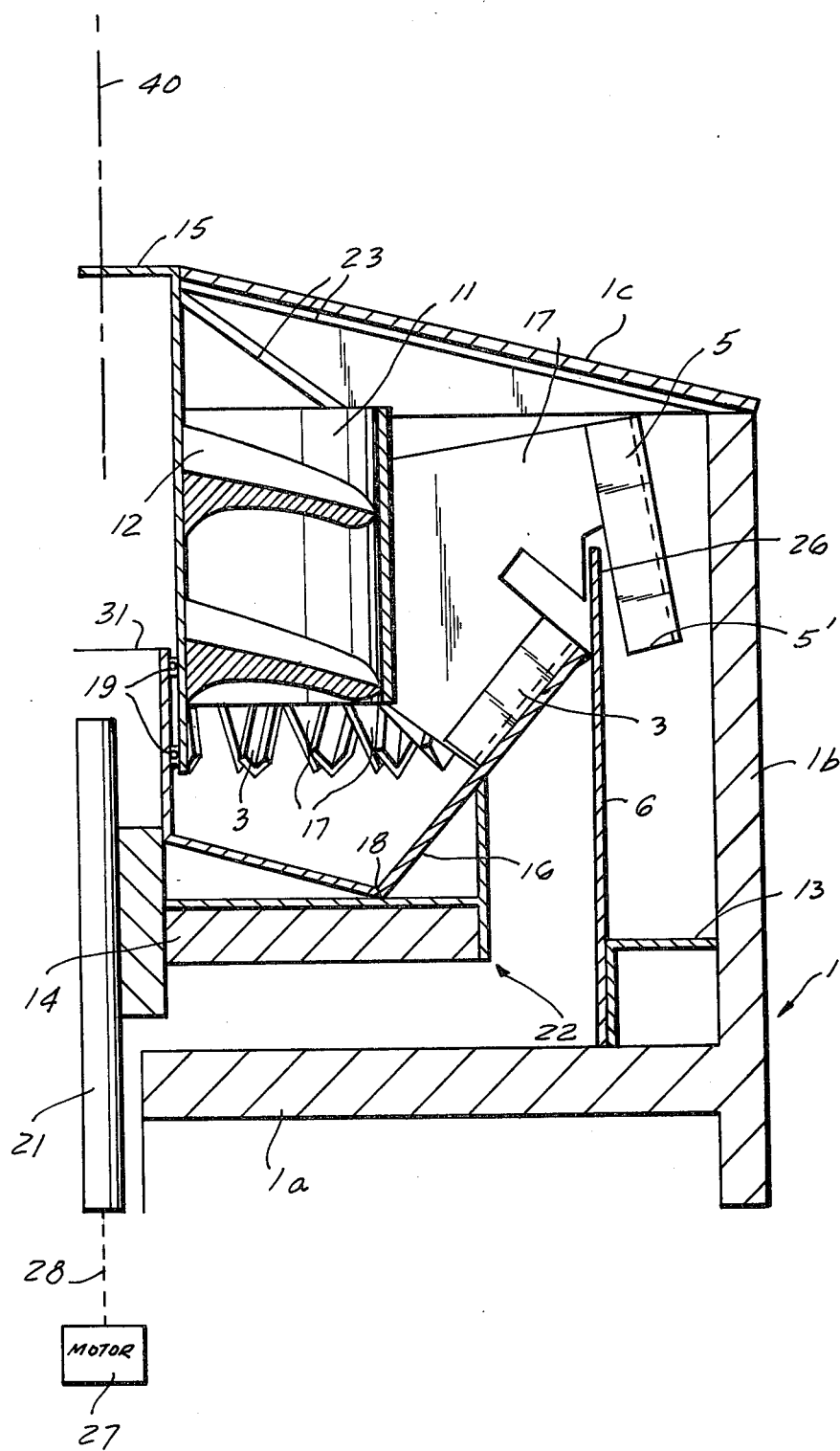
Figure 5:
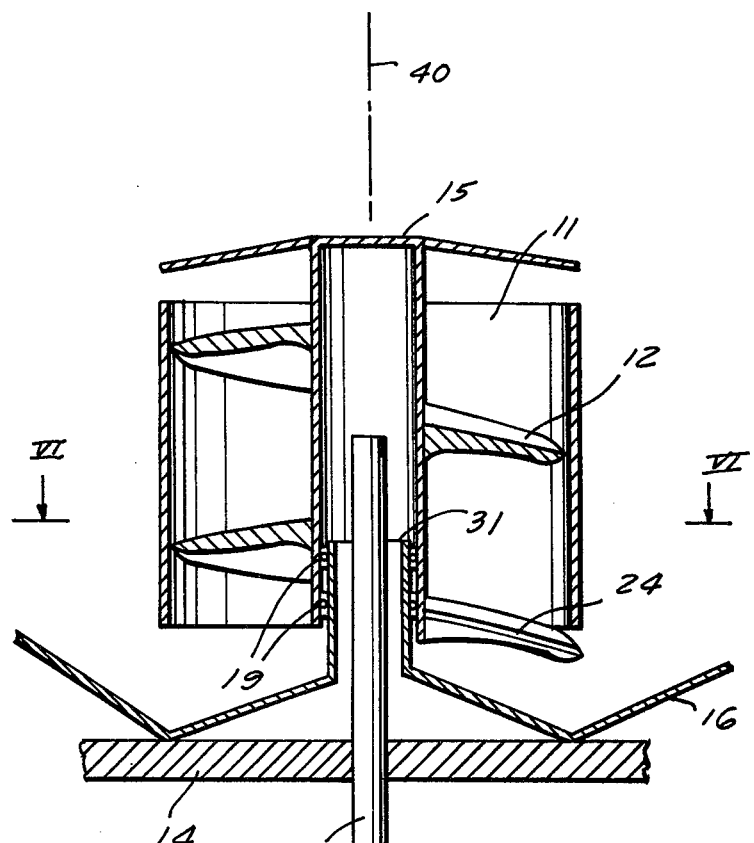
Figure 6:
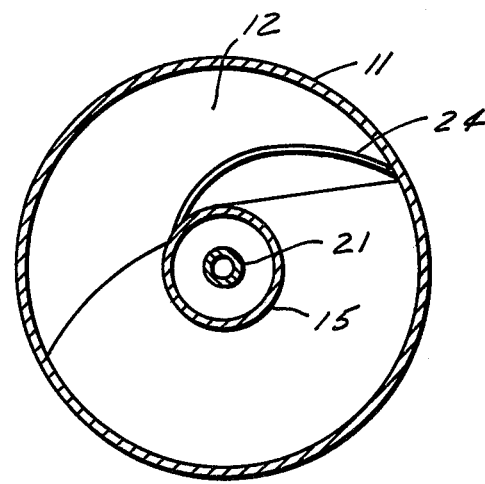

The apparatus shown in the drawing comprises a stationary housing 1 with a bottom 1a, a peripheral wall 1b and a roof 1c, the latter being supported by radial struts 23 emanating from a hollow stem 15 centered on a vertical axis 40. Journaled in stem 15, with the aid of ball bearings 19, is a hub 31 of a carrousel 30 which is rotatable about that axis by means of a motor 27 driving a shaft 21 through a transmission diagrammatically indicated at 28. Carrousel 30 comprises a platform 14 keyed to the shaft 21, this platform supporting an upwardly diverging frustoconical track 16. The inner periphery 18 of this track substantially registers with the peripheral wall of a drum 11 centered on axis O. Drum 11, connected with track 16 through a multiplicity of upright partitions 17 extending radially outwardly beyond the outer track periphery 20, closely surrounds a stationary helical ramp 12 carried on stem 15. The upper level of the ramp is accessible through a sectoral cutout 32 (FIG. 1) in roof 1c.

Figure 7:
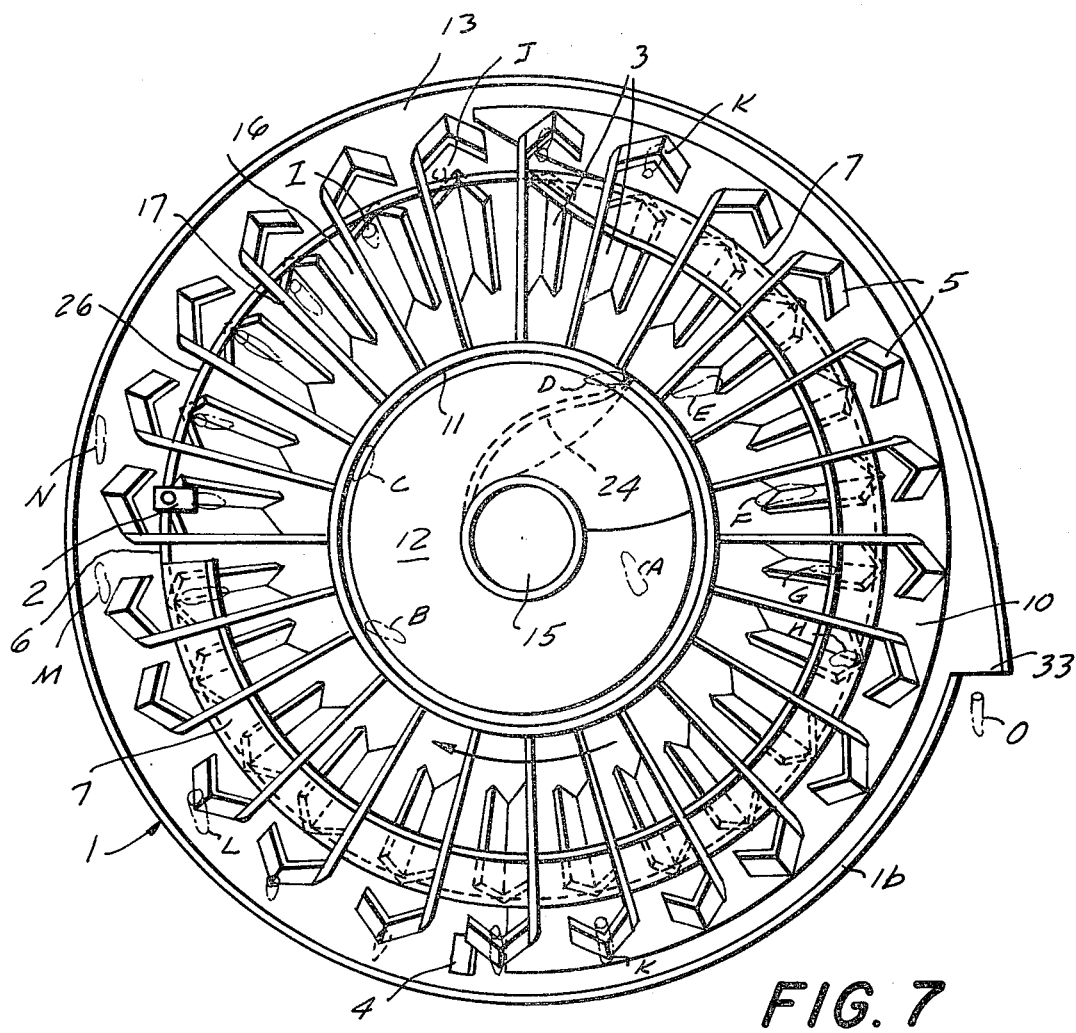
FIG. 7 is a view similar to FIG. 1 but with the cover removed, illustrating the positions of a carrot during successive operating phases.

An outer annular zone of track 16 carries a multiplicity of upwardly open troughs 3 disposed just forwardly of respective partitions 17 as seen in the direction of rotation, assumed to be clockwise in FIGS. 1 and 7. The troughs 3 form an array of radial, ascending channels terminating at periphery 20 at a close distance from an arcuate barrier strip 7 extending at right angles to the track surface over approximately 270°, thus leaving a gap of substantially one quadrant. Barrier 7 is a part-frustoconical upward extension of a stationary guard ring 6 closely surrounding the track 16. A cutter blade 2 is fixedly disposed at the beginning of this gap, as seen in the direction of rotation, at a distance from periphery 20 somewhat less than that of barrier 7; this distance is preferably adjustable. Partitions 17 carry a second array of troughs 5, registering with respective troughs 3, which form steeply descending channels 5 aligned with the respective troughs 3 and open toward axis 40. Troughs 5 have lower ends 5' closely spaced from another arcuate barrier 10 underlying them, barrier 10 being roughly semicircular so as to leave a gap of approximately 180°. Another stationary cutting blade 4 is positioned at the entrance of this latter gap, again as seen in the direction of rotation, parallel to barrier 10 and at a slightly higher, preferably ajustable level.

The ramp 12 is pitched downwardly toward drum 11 so that roots fed in through opening 32 tend to slide toward the drum periphery where they are frictionally entrained to reach the bottom of the ramp substantially at the speed of carrousel 30. The ramp is formed at that bottom with a transverse ridge 24 serving to orient the roots in a substantially radial direction as they leave the ramp upon clearing the lower edge of the drum. With the rotary speed of the exiting roots only slightly less than that of the partitions 17 sweeping past, there is little danger that a root will be cut in two by such a partition. On the contrary, the partitions direct the roots into the several compartments defined by them, each root coming to rest against the forward face of a partition (as viewed in the direction of rotation) along which it is outwardly driven by centrifugal force. In this way the root is conducted into an ascending channel formed by the trough 3 associated with the respective partition and thus, eventually, into the path of the first cutter blade 2 which is separated from the end of barrier 7 by an angular distance so small that the radial position of the root does not change significantly before it is trimmed by this blade. Thereafter, the truncated root is intercepted by a vertical shield 26 formed as a straight upward extension of guard ring 6 along a nearly quadrantal arc up to the vicinity of barrier 10, the root being carried along this shield by the adjoining partition 17. After clearing the shield 26, the now substantially vertical root is centrifugally propelled into a descending channel formed by the associated trough 5 where its hitherto uncut end comes to rest on the underlying barrier 10. Just beyond the end of this barrier, the second cutter blade 4 trims off the lower, formerly trailing end of the root which is then allowed to drop onto a shelf 13 sloping toward an outlet 33.

Figure 8:
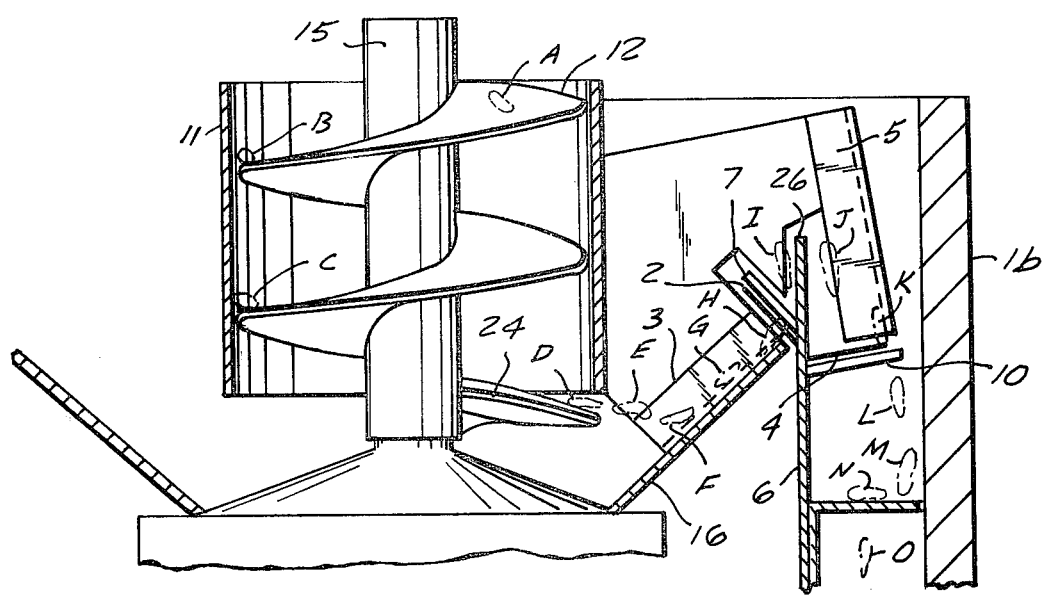
FIG. 8 is a diagrammatic sectional elevation showing the positions of a carrot at the operating phases indicated in FIG. 7.

In FIGS. 7 and 8 I have diagrammatically indicated, in phantom lines, a carrot undergoing the aforedescribed sequence of operations in a succession of phases labeled A-O. In phase A the carrot is deposited at the top of ramp 12. In phases B and C it is entrained down the ramp and peripherally accelerated by its contact with rotating drum 11. In phase D the carrot leaves the ramp at ridge 24, entering a trough 3 in phases E, F and G. In phase H it reaches the position wherein its leading end, to be chopped off by blade 2, lies in contact with strip 7. In phase I the partly trimmed carrot moves up along shield 26. Phase J represents the transfer to a trough 5 in which the carrot slides down to barrier 10 as indicated by phase K. Having been crowned a second time by blade 4, the trimmed carrot drops onto shelf 13 in phases L, M and N, eventually exiting at outlet 33 in phase O.

The root ends cut off by blades 2 and 4 also drop onto shelf 13 and, after leaving the outlet 33, can be separated from the accompanying root bodies by screening. With blades 2 and 4 adjustably mounted on housing 1, the length of these root ends may be readily varied.

A machine as herein disclosed can be designed to handle carrots at the rate at which they are processed by conventional steam-operated peeling equipment, i.e. of about 3 to 8 tons per hours.

I claim:

1. An apparatus for trimming the ends of elongate edible roots, comprising:

a carrousel forming an upwardly diverging frustoconical track centered on a generally vertical axis;

drive means for rotating said carrousel about said axis;

first guide means forming an array of substantially radial ascending channels on said carrousel for conducting a root deposited thereon, accelerated by centrifugal force, generally radially outwardly along one of said ascending channels;

first cutter means just beyond the radially outer ends of said ascending channels for trimming a leading end off an ascending root;

second guide means forming an array of substantially radial descending channels respectively aligned with said ascending channels on said carrousel beyond said first cutter means for conducting the trimmed root further outwardly along one of said descending channels, the latter being downwardly inclined with reference to said ascending channels at an angle sharp enough to let the root descend with its other end leading; and second cutter means just beyond the radially outer ends of said descending channels for trimming said other end off the descending;

said carrousel being provided with substantially radial upright partitions between the channels of each array, said ascending channels being a set of upwardly open first troughs on said track terminating at an outer periphery thereof, said descending channels being a set of more steeply sloping second troughs open toward said axis and disposed beyond said outer periphery.

2. An apparatus as defined in claim 1 wherein said second troughs are supported on extensions of said partitions projecting beyond said outer periphery.

3. An apparatus as defined in claim 1, further comprising a first stationary arcuate barrier closely spaced from said outer periphery for retaining oncoming roots in said first troughs, said first cutter means being disposed at a gap of said first barrier, and a second stationary arcuate barrier closely spaced from the path of said second troughs for retaining inverted roots therein, said second cutter means being disposed at a gap of said second barrier.

4. An apparatus as defined in claim 1, further comprising inlet means above said carrousel for depositing roots to be trimmed on a zone of said carrousel radially inward of said first troughs.

5. An apparatus as defined in claim 4 wherein said inlet means comprises a hopper centered on said axis.

6. An apparatus as defined in claim 5 wherein said inlet means further comprises a stationary helicoidal ramp centered on said axis, said hopper forming a substantially cylindrical wall closely surrounding said ramp.

7. An apparatus as defined in claim 6 wherein said wall is linked with said carrousel for joint rotation therewith.

* * * * *